(12) United States Patent
Jahani et al.

(10) Patent No.: US 9,274,276 B2
(45) Date of Patent: Mar. 1, 2016

(54) LIGHT CONFINING DEVICES USING ALL-DIELECTRIC METAMATERIAL CLADDING

(71) Applicant: The Governors of the University of Alberta, Edmonton (CA)

(72) Inventors: Saman Jahani, Edmonton (CA); Zubin Jacob, Edmonton (CA)

(73) Assignee: THE GOVERNORS OF THE UNIVERSITY OF ALBERTA, Edmonton, Alberta (CA)

(*) Notice: Subject to any disclaimer, the term of this patent is extended or adjusted under 35 U.S.C. 154(b) by 0 days.

(21) Appl. No.: 14/175,606

(22) Filed: Feb. 7, 2014

(65) Prior Publication Data

US 2014/0355930 A1    Dec. 4, 2014

Related U.S. Application Data

(60) Provisional application No. 61/762,146, filed on Feb. 7, 2013.

(51) Int. Cl.
| | |
|---|---|
| *G02B 6/12* | (2006.01) |
| *G02B 6/122* | (2006.01) |
| *G02B 27/01* | (2006.01) |
| *G02B 1/00* | (2006.01) |
| *G02B 6/02* | (2006.01) |
| *B82Y 20/00* | (2011.01) |

(52) U.S. Cl.
CPC .............. *G02B 6/1225* (2013.01); *G02B 1/002* (2013.01); *G02B 6/023* (2013.01); *G02B 6/0229* (2013.01); *G02B 6/02295* (2013.01); *G02B 27/0176* (2013.01); *B82Y 20/00* (2013.01); *G02B 2006/12035* (2013.01); *G02B 2006/12061* (2013.01); *Y10S 977/932* (2013.01)

(58) Field of Classification Search
CPC ...... B82Y 20/00; G02B 1/002; G02B 6/1225; G02B 6/02295; G02B 6/023; G02B 6/0029
USPC .................................................. 385/122–132
See application file for complete search history.

(56) References Cited

U.S. PATENT DOCUMENTS

| | | | |
|---|---|---|---|
| 9,031,362 B2* | 5/2015 | Lipson ................... | G02B 6/125 385/130 |
| 2008/0094300 A1* | 4/2008 | Lee .............................. | 343/844 |
| 2008/0219628 A1* | 9/2008 | Podolskiy et al. ............ | 385/123 |

(Continued)

OTHER PUBLICATIONS

Jiang et al.; Slow Wave Propagation in a Dielectric Cylindrical Waveguide with Anisotropic Metamaterial Cladding, 978-1-4244-2802-1/09/ © 2009 IEEE.*

(Continued)

*Primary Examiner* — Ryan Lepisto
*Assistant Examiner* — Guy Anderson
(74) *Attorney, Agent, or Firm* — LeClairRyan, a Professional Corporation

(57) ABSTRACT

An all-dielectric metamaterial cladding is provided that can strongly confine light inside conventional low-index dielectric waveguides for use with photonic integrated circuits and nano-photonic devices. A class of metamaterials with dual electric and magnetic anisotropy along with giant birefringence can provide the ideal quasi-transverse electromagnetic mode propagation inside a glass core. A Transformed Cladding Waveguide can show an order of magnitude decreased cross-talk as compared to conventional waveguides.

22 Claims, 6 Drawing Sheets

(56) References Cited

U.S. PATENT DOCUMENTS

2010/0053763 A1* 3/2010 Chowdhury et al. ......... 359/652
2010/0133488 A1* 6/2010 Giakos ......................... 252/582

OTHER PUBLICATIONS

Jiang et al.;Stopping light by an air waveguide with anisotropic metamaterial cladding;Jan. 5, 2009 / vol. 17, No. 1 / Optics Express 170.*

Jiang et al.;Compensating loss with gain in slow-light propagation along slab waveguide with anisotropic metamaterial cladding;Dec. 15, 2009 / vol. 34, No. 24 / Optics Letters 3869.*

Jiang et al.;Slow-light propagation in a cylindrical dielectric waveguide with metamaterial cladding, Received Jul. 28, 2011, in final form Sep. 28, 2011 Published Nov. 8, 2011 Online at stacks.iop.org/JPhysD/44/475103.*

* cited by examiner

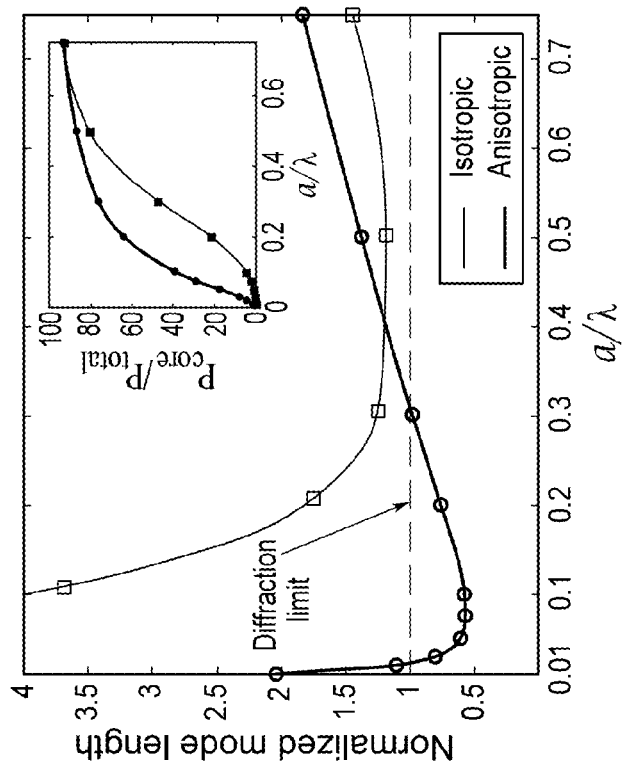
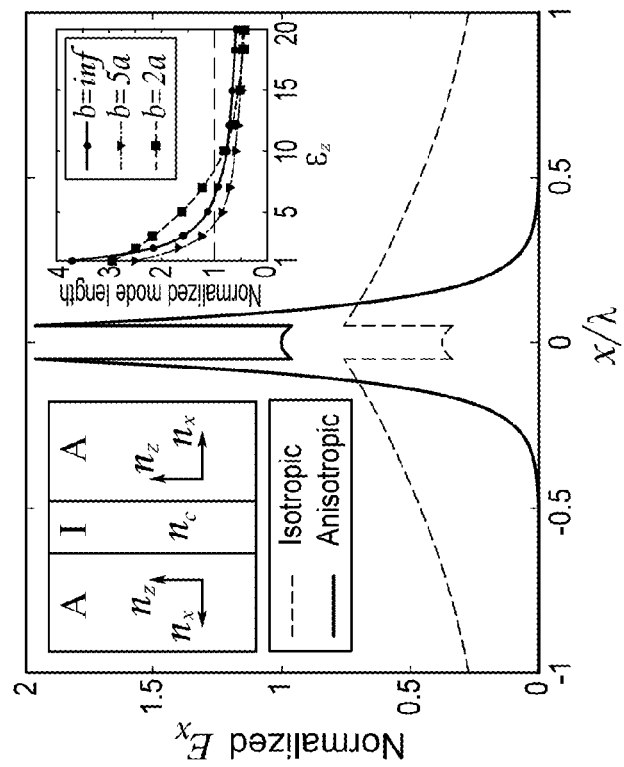
FIG. 2A
FIG. 2B

LIGHT CONFINING DEVICES USING ALL-DIELECTRIC METAMATERIAL CLADDING

This application claims the benefit of U.S. Provisional Patent Application Ser. No. 61/762,146, filed Feb. 7, 2013, which is hereby incorporated by reference in its entirety.

FIELD OF THE INVENTION

The present disclosure is related to the field of optical light confining devices such as resonators and waveguides, and more particularly to optical waveguides for use in integrated photonic circuits.

BACKGROUND OF THE INVENTION

Light has a characteristic size, the wavelength, which sets a limit to all conventional optical device sizes, especially waveguides and resonators. This limit called the diffraction limit is a fundamental obstacle and is defined as the size of the optical mode in a resonator or waveguide. The value is given by $(\lambda/2n_{core})^3$ in a 3D geometry, $(\lambda/2n_{core})^2$ in a 2D geometry and $(\lambda/2n_{core})^1$ in a 1D geometry. Here, $\lambda/2n_{core}$ is the wavelength in free space divided by twice the value of the refractive index of the core of the waveguide or resonator. The ability to overcome this limit is key to future photonic integrated circuits combining nano-scale electrical and micron-scale optical signals. It is also key to future active devices and lasers with a size the fraction of the wavelength. Coupling light to free electrons of metals leads to plasmonic waveguides that can overcome this limitation, but their high optical losses cause a reduced propagation length and high power consumption, a major impediment for integrated photonic circuits.

Modern communication and computation systems rely on the ability to route and transfer information using electronic and electromagnetic signals. Massive efforts over the last decade have been driven by miniaturization and integration of electronics and photonics on the same platform. Relying on optical waveguides as interconnects can increase the speed as well as functionality of integrated circuits, however, the diffraction limit of light is a fundamental barrier to interface micron scale waveguides to nanoscale electronic circuitry. Furthermore, dense photonic integration is hampered because crosstalk between waveguides increases as the separation between them is reduced.

At low frequencies metals, due to their high reflectivity, can be used for confining light at the subwavelength scale. At optical frequencies, metals can achieve the same task by coupling light to free electrons. This leads to a surface plasmon polariton (SPP) which shows properties of nanoscale waveguiding. A number of architectures have recently emerged to effectively utilize the SPP for waveguiding. These include the long range SPP on metal strip (IMI; wherein I≡insulator, M≡metal) waveguides which are useful for sensing applications but not for sub-diffraction confinement. The inverse design, MIM waveguides, confines light to subwavelength scales but leads to a low propagation length. V-groove and wedge plasmon are an excellent candidates for relatively long range propagation and sub-diffraction confinement, however excitation and detection of these modes as well as interfacing with existing silicon waveguide technology are a major challenge.

Recently, hybrid dielectric-plasmonic waveguides have emerged that confine light in a high index gap above metals reducing the field penetration in the metal thus allowing for increased propagation length. Another alternative is an epsilon-near-zero metamaterial waveguide which allows modes to tunnel through subwavelength size structures. However, due to absorption in metals, the above mentioned sub-diffraction plasmonic structures cannot guide light more than a few microns. Furthermore, the dissipated energy leads to thermal issues which are especially significant in miniaturized circuits hindering dense photonic integration.

It is, therefore, desirable to provide light confinement especially in an optical waveguide, and a cladding therefor, that overcomes the shortcomings of the prior art.

SUMMARY OF THE INVENTION

The waveguides according to the invention include all-dielectric metamaterial claddings that can strongly confine light inside low-index dielectric waveguides. To design the metamaterial claddings, transforming optical momentum for controlling evanescent waves can be used. These transformations lead to a medium that supports total internal reflection and simultaneously makes the evanescent field outside the core of the waveguide decay faster. These transformations also lead to a class of metamaterials with dual electric and magnetic anisotropy and a very large birefringence which provides an ideal quasi-transverse electromagnetic mode propagation inside a glass core. Magnetism at the telecommunication wavelength is a challenge and strong confinement of the electric energy of a waveguide mode can be achieved with lossless semiconductor metamaterials. Transformed cladding waveguides with a permittivity, $\mu_{ij}=1$, and a permeability, $\epsilon_{ij}>1$, provide an order of magnitude decreased crosstalk as compared to conventional waveguides making them suitable for multiple applications in dense photonic integration and nanophotonic devices.

An optical waveguide having a cladding composed of all-dielectric metamaterials is provided. In some embodiments, the diffraction limit of light can be surpassed by the use of a new class of metamaterials having a dielectric response that cannot be found in nature, but can be nanofabricated with readily available building blocks. These metamaterials do not have metallic building blocks thereby overcoming the shortcoming related to loss in the prior art. The rules of transformation optics can be used to transform optical momentum for controlling evanescent waves. With this class of transformations, it is possible to confine light inside a subwavelength low-index dielectric rod surrounded by metamaterial claddings. This transformation can cause the propagating mode to become close to a transverse electromagnetic (TEM) mode. In some embodiments, a practically achievable all-dielectric metamaterial waveguide can be shown with reduced mode area and increased power confinement in the core for use in dense photonic integration. In some embodiments, the metamaterial waveguide can dramatically decrease crosstalk between two slab waveguides at infrared wavelengths and, in some embodiments, at the telecommunication optical wavelength (i.e. 1550 nm).

Broadly stated, in some embodiments, an optical waveguide is provided for use with electromagnetic signals operating at infrared wavelengths, the optical waveguide including: a core that is substantially transparent at the infrared wavelengths, the core including a longitudinal axis, z, and orthogonal axes, x and y, that are substantially perpendicular to the longitudinal axis, the core having a radius in a plane defined by the x and y axes that is a fraction of the infrared wavelengths; and a metamaterial cladding disposed around the core, the cladding configured to provide quasi-transverse electromagnetic mode propagation of the electromagnetic signals along the z axis of the core.

Broadly stated, in some embodiments, a method is provided for routing and transferring information on a photonic integrated circuit using electronic and electromagnetic signals operating at infrared wavelengths, the method including the steps of: providing at least one optical waveguide for use with the signals, the optical waveguide having: a core that is substantially transparent at the infrared wavelengths including a longitudinal axis, z, and further comprising orthogonal axes, x and y, that are substantially perpendicular to the longitudinal axis, the core having a radius in a plane defined by the x and y axes that is a fraction of the infrared wavelengths, and a metamaterial cladding disposed around the core, the cladding configured to provide quasi-transverse electromagnetic mode propagation of the electromagnetic signals along the z axis of the core; placing the optical waveguide on the photonic integrated circuit between an infrared transmitting device and an infrared receiving device; and transmitting the signals between the infrared transmitting and receiving devices.

Broadly stated, in some embodiments, the core includes silica.

Broadly stated, in some embodiments, the core is a cross-section shape, either circular, square, rectangular, slab, slot, strip or rib.

Broadly stated, in some embodiments, the cladding includes a homogeneous anisotropic metamaterial.

Broadly stated, in some embodiments, the cladding includes alternating layers of high index semiconductor and a second low index cladding material, wherein each layer of high index semiconductor and the second cladding material is a width that is a fraction of the infrared wavelengths.

Broadly stated, in some embodiments, the high index semiconductor in the metamaterial includes Germanium or Silicon.

Broadly stated, in some embodiments, the second cladding material includes air, silica, porous silica or silicon.

Broadly stated in some embodiments the cladding includes nanowires of high index media in a low index material host.

Broadly stated in some embodiments the nanowires are made of Germanium or Silicon.

Broadly stated in some embodiments, the low index material host for nanowires is made of alumina.

Broadly stated, in some embodiments a photonic integrated device is provided, including the optical waveguide as described above.

The metamaterial cladding according to the invention utilizes no metal, no periodicity, uses anisotropy for total internal reflection and optical momentum transformation and behaves differently from all prior art involving slot waveguides, photonic crystals, plasmonic waveguides.

An optical waveguide for use with electromagnetic signals operating at infrared wavelengths is provided, the optical waveguide including a core that is substantially transparent at the infrared wavelengths, the core having a longitudinal axis, z, and orthogonal axes, x and y, that are substantially perpendicular to the longitudinal axis, the core further having a radius in a plane defined by the x and y axes that is a fraction of the infrared wavelengths; and a metamaterial cladding disposed around the core, the cladding anisotropy configured to provide total internal reflection and also increase the decay of evanescent waves, the waveguide providing quasi-transverse electromagnetic mode propagation of the electromagnetic signals along the z axis of the core, provide sub-diffraction confinement of light without loss and strong confinement of light inside the core using metamaterial anisotropy. The core may include silica or silicon. The core may have a cross-section shape that is one or more from a group consisting of circular, square, rectangular, slab, slot, strip and rib.

The cladding may include a homogeneous lossless anisotropic metamaterial. The cladding may have alternating thin film layers of a high index semiconductor and a second low index cladding material, wherein each layer of high index semiconductor and the second cladding material has a width that is a fraction of the infrared wavelengths. The high index semiconductor may be Germanium or Silicon. The second cladding material may include one or more from a group consisting of air, silica, porous silica and silicon. A photonic integrated device may include at least one optical waveguide as set forth above and may use anisotropy to increase decay of evanescent waves.

If the core of the waveguide has a circular, rectangular, or any other arbitrary shaped cross section, the anisotropic cladding can be high index semiconductor rods (e.g. Germanium and Silicon) with a diameter a fraction of the wavelength placed in a low index dielectric host (e.g. Silica, Porous Silica, air, and low index polymers).

A method for routing and transferring information on a photonic integrated circuit using electronic and electromagnetic signals operating at infrared wavelengths is provided, the method including the steps of: (a) providing at least one optical waveguide for use with the signals, the optical waveguide having: (i) a core that is substantially transparent at the infrared wavelengths, the core having a longitudinal axis, z, and further comprising orthogonal axes, x and y, that are substantially perpendicular to the longitudinal axis, the core having a radius in a plane defined by the x and y axes that is a fraction of the infrared wavelengths, and (ii) a metamaterial cladding disposed around the core, the cladding configured to provide total internal reflection and fast decay of evanescent waves, (iii) a metamaterial cladding with strong anistropy to provide quasi-transverse electromagnetic mode propagation of the electromagnetic signals along the z axis of the core; and (iv) a metamaterial cladding configured to provide lossless sub-diffraction confinement of light; (b) placing the at least one optical waveguide on the photonic integrated circuit between an infrared transmitting device and an infrared receiving device; and (c) transmitting the signals between the infrared transmitting and receiving devices.

An electromagnetic wave confining device is provided that has anisotropic dielectric constants in the cladding providing total internal reflection and fast decay of evanescent waves and provides reduced cross-talk between adjacent devices.

A matter wave confining device is provided that has anisotropic effective mass providing reduction of tunneling of matter waves.

An electromagnetic signal confining device utilizing anisotropic metamaterial cladding functioning at Tera-hertz and microwave frequency ranges is provided to provide miniaturization of dielectric antennas and to provide coupling reduction between antenna elements in an antenna array A light confining device with a core surrounded by anisotropic metamaterial cladding is provided which uses no metallic components; causes no absorption losses in the metamaterial; provides reduced cross-talk between adjacent waveguides for photonic integration; confines light as a resonator below the diffraction limit for active devices; provides reduction in energy transfer between devices if the core of the waveguides are active; provides increase in the spontaneous emission rate of an emitter if placed inside the core; and provides enhanced nonlinearity if the core is non-linear.

BRIEF DESCRIPTION OF THE DRAWINGS

FIG. 2A displays an electric field of a waveguide according to the invention. FIG. 2B displays a mode length comparison.

DETAILED DESCRIPTION OF THE INVENTION

Figure 1A:
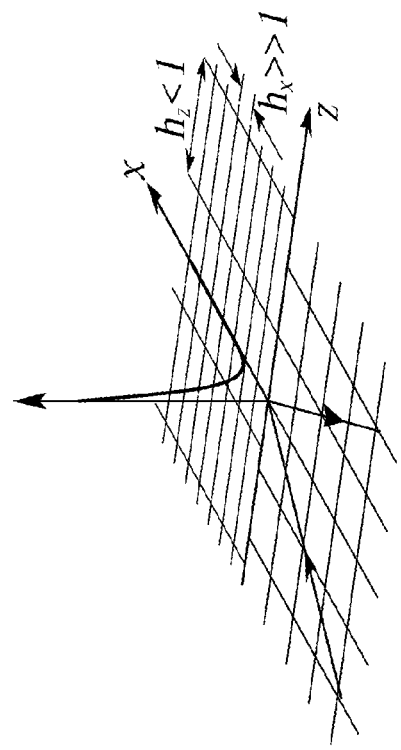
FIGS. 1A and 1B show X-Y-Z graphs depicting the phenomenon of refraction and reflection of light for: a non-transformed medium in the X-direction; and a transformed medium in the X-direction.

An optical waveguide having a cladding composed of all-dielectric metamaterials is provided.

All-dielectric waveguides are useful for low-loss confinement of electromagnetic waves at optical frequencies, e.g. slot waveguides and photonic crystal waveguides. Slot waveguides can confine and enhance the electric field inside a sub-diffraction low-index dielectric slot between high index waveguides, which is suitable for many applications, such as nonlinear and quantum optics. The enhancement in the slot arises due to the continuity condition on the displacement vector at the low-index/high-index interface. However, most of the power lies outside the slot region and decays slowly. Thus, the slot waveguide performance in a dense Photonic Integrated Circuit ("PIC") is not comparable to a conventional rod waveguide due to crosstalk.

The light confinement mechanism in Photonic crystal ("PhC") waveguides is the bragg reflection of waves in the bandgap of the PhC. The properties of these waveguides include low radiation loss at sharp bends; but perturbing periodicity with multiple waveguides is not possible.

In some embodiments, the diffraction limit of light can be surpassed by the use of a class of metamaterials having a dielectric response that cannot be found in nature, but can be nanofabricated with available building blocks. The rules of transformation optics can be used to transform optical momentum for controlling evanescent waves. With this class of transformations, it is possible to confine light inside a subwavelength low-index dielectric rod surrounded by metamaterial claddings. This transformation can cause the propagating mode to become close to a transverse electromagnetic ("TEM") mode. In some embodiments, an all-dielectric metamaterial waveguide can be achieved using the Silicon-On-Insulator platform with increased power confinement in the core for dense photonic integration. In some embodiments, the proposed metamaterial waveguide can dramatically decrease crosstalk between two slab waveguides at the telecommunication wavelength (i.e. 1550 nm).

In some embodiments, a solution can be found using the rules of transformation optics ("TO"), which state that Maxwell's equations written in a transformed coordinate system preserve their original form if the material parameters are renormalized. Thus, an optical functionality can be interpreted as a distortion of a Cartesian mesh and the rules of transformation optics lead to the exact material parameters which can achieve this optical functionality. Such transformation optical devices have allowed control over the electromagnetic fields of propagating waves and the flow of energy for applications such as invisibility.

In some embodiments, the concept of transforming optical momentum can be used to control the physical property of a medium that governs whether a wave propagates or decays in the medium. In some embodiments, this approach, in contrast with previous approaches which primarily dealt with propagating waves, can allow control over evanescent waves which is necessary for waveguiding. If a Cartesian mesh in a region of empty space is transformed according to $x'=f(x)$ etc., the optical momentum of propagating or evanescent waves in the region is then transformed to:

$$\frac{k_{x'}^2}{h_x^2} + \frac{k_{y'}^2}{h_y^2} + \frac{k_{z'}^2}{h_z^2} = k_0^2$$

wherein the coordinate transformation is characterized by the Jacobian matrix diag $[h_x, h_y, h_z]$, the transformed wavevector $\vec{k}=[k_{x'}, k_{y'}, k_{z'}]$ and $(k0=2\pi/\lambda)$ $k_0=\omega/c$ is the free space wavevector. The optical momentum transformation in comparison with the dispersion relation for vacuum is found to be $k_{x'}=h_x k_x$, $k_{y'}=h_y k_y$, and $k_{z'}=h_z k_z$. Note that although constitutive parameters are anisotropic in general, the momentum transformation for all waves are described by this quadratic (not quartic) formula. This is a consequence of $$\frac{\mu_i^{old}}{\varepsilon_i^{old}} = \frac{\mu_i^{new}}{\varepsilon_i^{new}} (i = x, y, z),$$

a condition defined herein as dual electric and magnetic anisotropy.

Consider the conventional light guiding mechanism of total internal reflection at the interface of two dielectrics using momentum transformations. A plane wave travelling in vacuum (region I) is partially reflected back at x=0 because there is a discontinuity in the "electromagnetic grid" representing optical space, as shown in FIG. 1A.

FIG. 1 generally displays the phenomenon of refraction and reflection revisited using transformation of optical momentum. Rays of light are reflected and refracted at an interface since the mesh representing electromagnetic space has a discontinuity. FIG. 1A shows how total internal reflection can be viewed as a transformation of optical momentum. When grid sizes in the second medium become large enough, the incident ray is totally reflected and evanescently decays in the second medium.

Figure 1B:
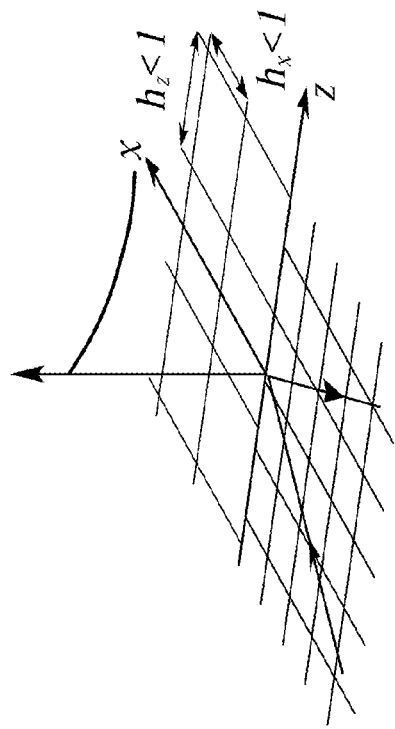

Electromagnetic boundary conditions require the tangential momentum and, hence, the phase to be continuous across this interface. For a given wave incident in a particular direction with $\vec{k}=[k_{x1},k_{y1},k_{z1}]$, the ray can be completely reflected back if the transformed momentum in the tangential direction $k_{z1}/h_z$ exceeds the maximum possible momentum in the medium $k_{z1}/h_z > k_0$ (as shown in FIG. 1B). This causes the wave to decay away along the x-direction in region x>0. Since $k_{z1}<k_0$, the condition for the possibility of total internal reflection is that the transformation should be such that $h_z<1$. FIG. 1B displays how only one component of the dielectric tensor controls the total internal reflection condition. By transforming the space in the other direction, one can control the momentum of evanescent waves and consequently decrease penetration depth in the second medium.

Figure 1C:
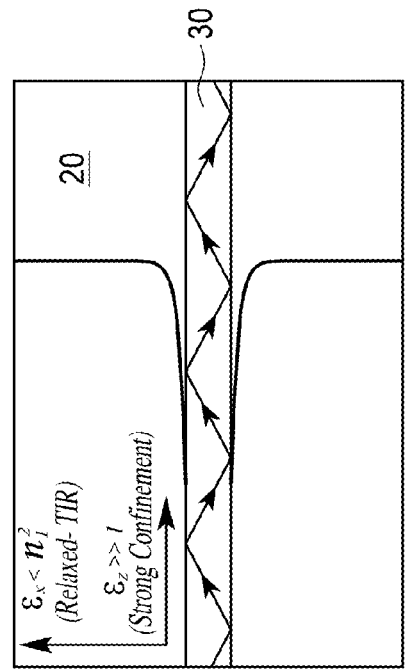
FIGS. 1C and 1D are drawings depicting light confinement inside a low-index dielectric waveguide with metamaterial claddings according to the invention.
Figure 1D:
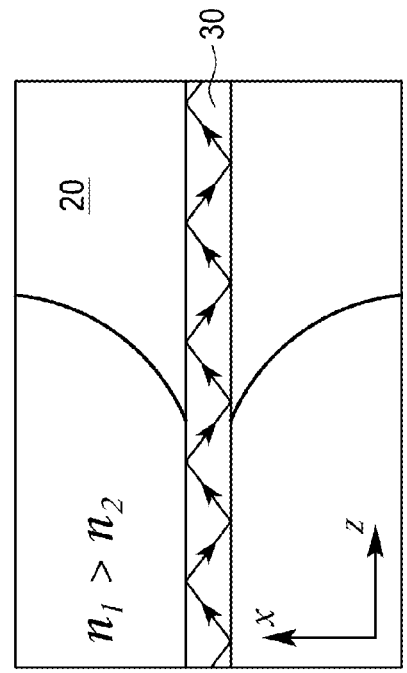

For this set of transformations that cause total internal reflection, the wave extends evanescently into the second medium. Note that the total internal reflection is governed by the momentum transformation only in the z direction, and not the x direction. Using this additional degree of freedom, we transform the optical momentum of evanescent waves to lead to enhanced confinement of the wave in the region with x>0 (as shown in FIG. 1B, which shows a transformation that compresses the optical grid along the x-direction with $h_x \gg 1$). This increases the momentum of the wave along the x-direction and hence causes a faster decay of evanescent waves in region II. Thus the final transformation which causes total internal reflection and also a fast decay of evanescent waves requires the transformed optical grid to have $h_z<1$ and $h_x \gg 1$. FIG. 1C shows a conventional waveguide based on total internal reflection. As the core size is decreased, most of the power lies outside and decays slowly in the cladding (20). FIG. 1D displays an embodiment of a transformed cladding waveguide. Relaxed total internal reflection ($\in x < n12$) preserves the conventional waveguiding mechanism; and the light decays fast in the cladding as the optical momentum in the cladding is transformed using anisotropy ($\in x \gg 1$). Thus the wave can be confined inside the core going rise to sub-diffraction optics with completely transparent media.

Quasi TEM Waveguide

Figure 4B:
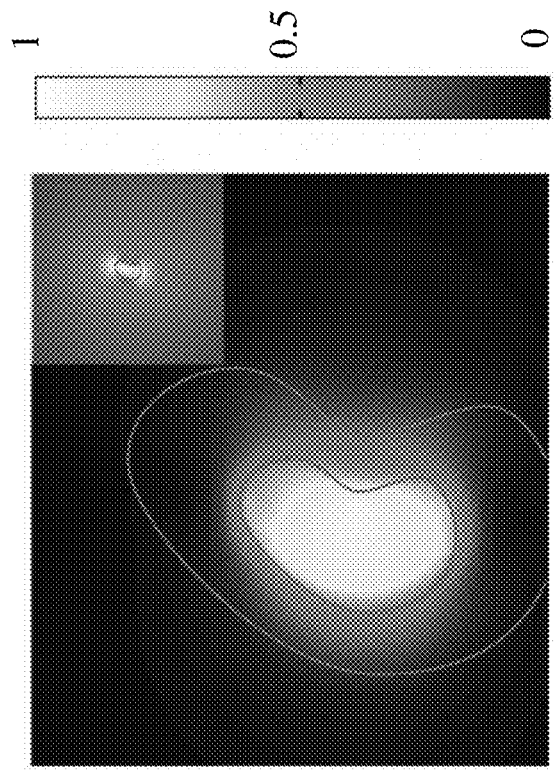
FIG. 4B is a simulated distribution of the electric energy density of the waveguide of the waveguide without cladding.
Figure 4A:
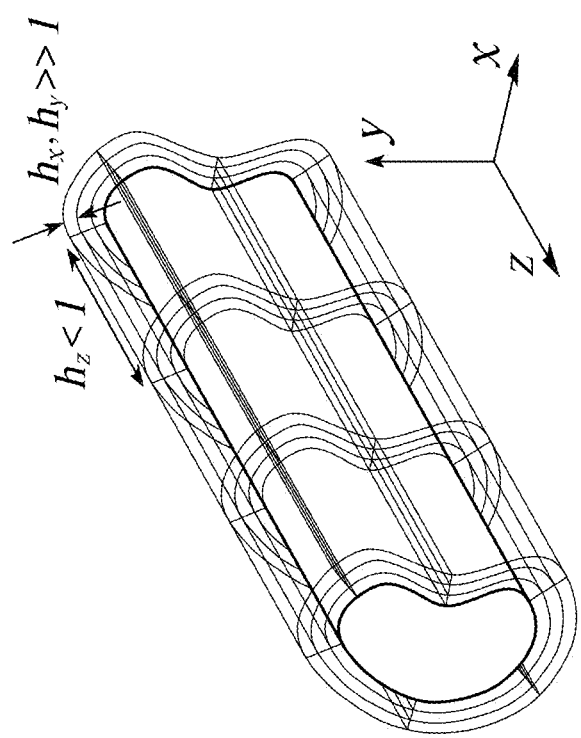
FIG. 4A is a perspective view of a cross section of a dielectric waveguide using metamaterial claddings.

The momentum transformation can be applied to surround an infinitely long glass rod with an arbitrary shaped cross sectional ($A \ll \lambda^2$). The electromagnetic grid has a finite width and, in some embodiments, needs to achieve $h_x, h_y \gg 1$ and $h_z<1$ to allow for the lowest-order mode to travel inside the glass core and bounce off by total internal reflection but simultaneously decay away rapidly causing sub-diffraction confinement of the mode (as shown in FIG. 4A). This transformation also causes the longitudinal components of fields, in comparison to the transverse ones, to go zero. Indeed, the electric and magnetic fields for the transformed waveguide can be related to the untransformed ones as:

$$\frac{E'_x}{E'_z} = \frac{h_x}{h_z}\frac{E_x}{E_z} = \gamma\frac{E_x}{E_z} \text{ and } \frac{H'_x}{H'_z} = \frac{h_x}{h_z}\frac{H_x}{H_z} = \gamma\frac{H_x}{H_z}$$

and due to the large confinement factor ($\gamma$), the longitudinal field components become negligible. Thus, the transformed propagating mode is a quasi-TEM mode, and in contrast to conventional waveguides at low-frequencies, it does not need two reflectors or perfect conductor at boundaries. FIG. 4B shows the simulation results for a sub-diffraction arbitrary shaped glass waveguide with average radius of $\lambda/10$ covered by a transformed cladding 20 (with $h_x=h_y=5$ and $h_z=1.2$). Note that in these embodiments, the relaxed condition of $h_z=1.2$ since the inner medium 30 is glass, not air. It can be seen that fields are concentrated in the low-index sub-diffraction dielectric, and they are almost transverse to the propagation direction.

The class of artificial media that lead to these momentum transformations will have $\in x, \in y < \in glass$ and $\mu x, \mu y < \mu glass$ while $\mu z, \in z \gg 1$. Note that we also have $\in_x = \mu_x$, $\in_y = \mu_y$, and $\in_z = \mu_z$ thus allowing single mode propagation in spite of the anisotropy. This class of artificial media are referred to herein as "dual-anisotropic-giant-birefringent metamaterials". Although momentum transformations, unlike conventional TO applications, can be fulfilled by homogenous materials, the cladding 20 must be dual-anisotropic which is difficult to implement at optical frequencies. However, general dual-anisotropic structures can potentially be implemented at terahertz or microwave frequencies.

Nonmagnetic Waveguide

FIGS. 4A and 4B display light confinement inside a low-index 2D dielectric waveguide using metamaterial claddings. FIG. 4A displays the confinement of a guided wave inside a transparent low index dielectric with arbitrary cross section. The momentum transforming cladding surrounding the core preserves total internal reflection and simultaneously leads to rapid decay of evanescent waves outside the core. With a nonmagnetic cladding, the electric field momentum can only transform in the cladding. However, even this reduced implementation can confine electric energy inside a low index dielectric. One set of non-magnetic media which can cause the momentum transformation are anisotropic homogenous dielectric materials with $\in_x = \in_y < \in_{glass}$ and $\in_z \gg 1$. The simulated electric energy density of the arbitrary shaped waveguide but with an all-dielectric anisotropic cladding ($\in x = \in y = 1.2$ and $\in z = 20$) is shown in FIG. 4B. For comparison the waveguide without cladding is shown in the inset. The numerical calculation shows that about 40% of the total power is inside the low refractive index core and the mode area for this waveguide is about $6A0$ ($A0=(\lambda/2ncore)^2$). Without the momentum transformed cladding, the fundamental mode of the subwavelength core is weakly guided and most of the power lies outside the core. The calculated mode area for the bare waveguide is about $80A0$ and only 1% of the total power lies inside the core. Such a strong anisotropy does not occur readily in nature and the maximum contrast between permittivity tensor elements is low for natural dielectrics (e.g. $TiO_2$) as well as artificial polymers. However, this extreme anisotropy is realized by artificially structured media using available lossless dielectrics.

Slab Waveguide

The optical telecommunication wavelength (i.e. 1550 nm) using practical achievable all-dielectric metamaterials can transform the optical momentum to confine the fundamental transverse magnetic (TM) mode of a slab waveguide 30. One embodiment of the invention is to use multilayer combination of two different dielectrics with high refractive index contrast with a periodicity much smaller than the operating wavelength. These multilayer structures can show strong anisotropy. For example, a multilayer combination of germanium (n=4.3) and air, with a germanium fill fraction of ρ=0.35, effectively shows strong anisotropy ($\in_x$=1.6 and $\in_x$=7.1) at 1550 nm.

For the purposes of this document, fill fraction is defined as:

$$d_{Ge}/(d_{Ge}+d_{air}),$$

wherein $d_{Ge}$ and $d_{air}$ are the thickness of each layer of germanium and air, respectively.

FIG. 2A displays a plot of a normalized tangential electric filed of the TM mode for a glass slab waveguide with a size of 0.1λ surrounded by all-dielectric metamaterial cladding. In this example, the metamaterial has a dielectric constants of $\in$x=1.1 and $\in$z=20. On comparison with a conventional mode which has air as the surrounding medium, a rapid decay of the evanescent fields is observed. The plots are normalized to the same input electric charge. The inset shows that as the anisotropy of the cladding increases the mode length decreases significantly below the diffraction limit with completely transparent media. This can be accomplished with a cladding size (width b) three times that of the core (width a). FIG. 2B is a mode length comparison with core size that shows that the anisotropic cladding ($\in$x=1.1 and $\in$z=20) can confine the TM mode to sub-diffraction values. The inset shows that the net power in the core is also higher for the TCW as compared to conventional waveguides.

In comparison to a conventional waveguide configuration with surrounding media as air, it can be seen that the transformation leads to light confinement. In the former case, only 12% of total power is inside the slab, but with the above cladding, power confinement increases up to 35%, and decays three-times faster outside the slab. It is also observable that the maximum power density is three-times higher for the anisotropic case with the same input power. The mode length for bar waveguide is 3.67L0 which decreases to 1.26L0 with the transformed cladding (L0=λ/2ncore). Confinement is fulfilled without the help of free electrons, which are always accompanied with high optical losses.

Photonic Integration

Figure 3A:
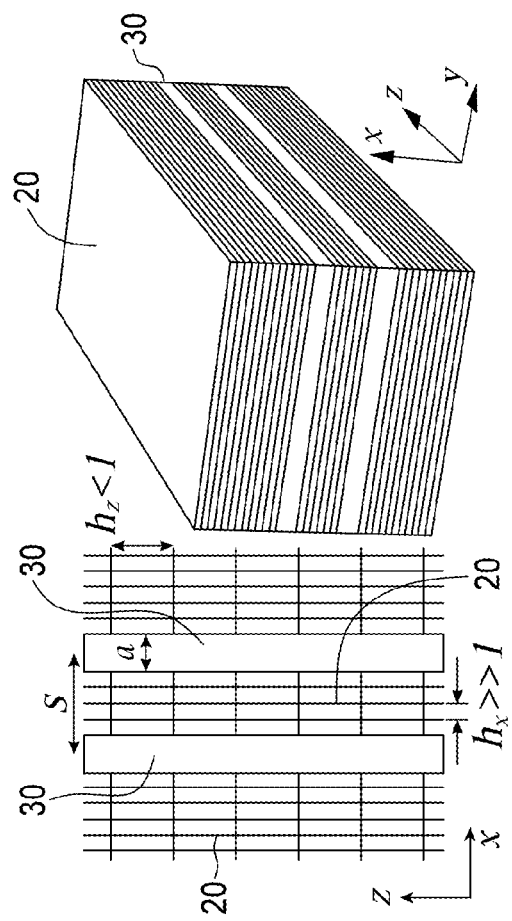
FIG. 3A is a cross sectional view and a perspective view of a photonic device having a pair of glass slab waveguides and thin film all-dielectric metamaterials.
Figure 3B:
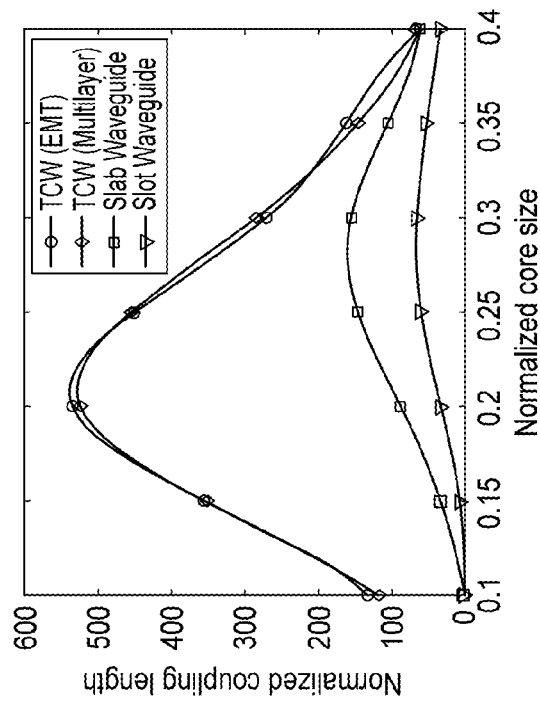
FIG. 3B is a chart showing the comparison of coupling length (cross talk) for conventional slab waveguides, slot waveguides, and transformed cladding waveguides.

For dense photonic integration, coupling between adjacent waveguides is reduced once their sizes approach the diffraction limit. A major advantage of the all-dielectric metamaterial cladding is the reduced cross-talk between devices which arises due to rapid decay of momentum transformed evanescent waves. FIG. 3A shows schematic grids for two coupled slab waveguides 30 where the cladding 20 has been transformed to allow total internal reflection but strong decay of waves in the cladding. As mentioned previously, a periodic multilayer combination of a high-index and low-index dielectric shows extreme effective anisotropy needed for the optical momentum transformation. FIGS. 3A and 3B display dense photonic integration at optical telecommunication wavelength (λ=1500). As shown in FIG. 3A the mesh transformation that gives rise to a cladding with low cross-talk between closely spaced waveguides can be achieved by surrounding the waveguide cores 30 with multilayer all-dielectric metamaterials 20. The multilayer metamaterial may include alternating sub-wavelength layers of Germanium (26 nm) and Silica (14 nm). This all-dielectric structure achieves the anisotropy of $\in$x=4.8 and $\in$z=11.9.

FIG. 3B shows a comparison of coupling length (crosstalk) for conventional slab waveguides, slot waveguides and transformed cladding waveguides. It shows that the TCW improves the cross-talk by an order of magnitude and the practical multiplayer structure result is in excellent agreement with the effectively anisotropic cladding. The core is silicon with a center to center separation of 0.5λ between waveguides. Each slot-waveguide has the same net size as the core of the other waveguides; the slot size is 0.01λ and is filled with glass. If the slot size is larger or the slot index is lower, the cross talk performance is worse than that shown in FIG. 3B. The chart also shows that the slot waveguide cross-talk is always more than the conventional waveguide.

A common criterion for finding coupling between two adjacent waveguides is coupling length, the length, Lc, for which the total power can be transferred from one waveguide to another one (Lc≡π/|βe−βo|) wherein βe and βo are the propagation constant of the symmetric (even) and antisymmetric (odd) modes of coupled waveguides. For low crosstalk, the coupling length must be much higher than the waveguides length, or in other words, βe and βo must become close to each other. Consequently, the power decays fast outside the waveguides and become negligible at the midpoint between waveguides.

An example of an embodiment of the invention includes coupled silicon slabs with a size of 2α=0.1λ and center-to-center separation of s=0.5λ surrounded by metamaterial claddings made of multiple subwavelength layers of germanium and silica with germanium filling fraction of ρ=0.6 at 1550 nm. Effective medium theory (EMT) predicts this non-magnetic cladding to have $\in_x$=4.8 and $\in_z$=11.9. The analytically calculated coupling length for this structure is 132λ, which is one order of magnitude larger than the coupling length when the slabs are surrounded by bulk silica (6λ). This momentum transformation also helps to increase the power confinement in the core from 25% to 45%.

For comparative purposes calculations of the propagation constants numerically using CST Microwave Studio for the homogenous anisotropic cladding are shown in FIG. 3A and a practical multilayer structure with a unit cell size of Λ=40 nm. The field plots for the homogenized cladding and the practical multilayer structure show good agreement depicting the increased confinement and reduced fields in the half plane between the waveguides. The increased coupling length for the practical structure is 119λ in agreement with EMT calculations. The proposed planar metamaterial cladding can be readily fabricated using existing fabrication techniques allowing dense photonic integration and interfacing with conventional waveguide cores.

All-Silicon Transformed Cladding Waveguide:

Transformed cladding waveguides ("TCW") can be adopted to a silicon-on-insulator ("SOI") platform. Two types of silicon waveguides are commonly used for a PIC design: rib waveguides with typical width in a range of 1-8 μm; and silicon strip waveguides with width in a range of 250-800 nm. Rib waveguides exhibit lower loss, but strip waveguides are relatively more compact. However, the size and possibility of dense photonic integration is restricted by the diffraction limit.

Figure 6C:
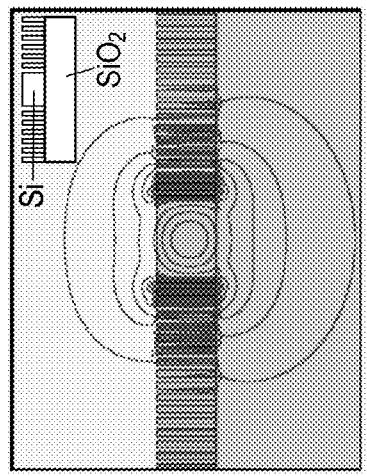
FIG. 6C shows the simulation results of the normalized x-component of the electric field for a transformed cladding waveguide.
Figure 6B:
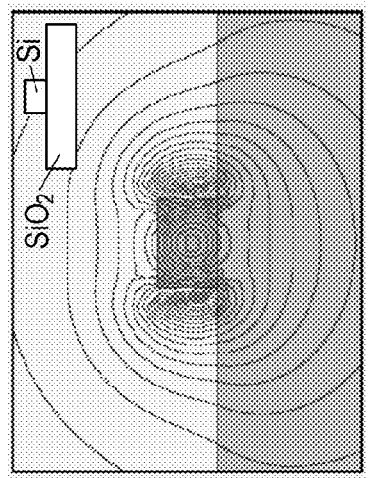
FIG. 6B shows the simulation results of the normalized x-component of the electrical field for a bare waveguide.
Figure 6A:
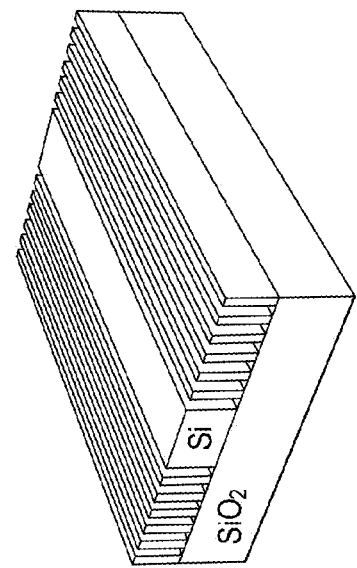
FIG. 6A shows a schematic view of a silicon strip waveguide according to the invention.

The quasi-TE mode (x-polarized) of a strip waveguide is analogous to the TM mode of a 2D slab waveguide described previously since the y-component of the electric field is relatively negligible. Therefore the momentum in cladding can be transformed using non-magnetic metamaterials. To design the cladding, we utilize the high index contrast between silicon (n=3.47) and air. Strong anisotropy can be effectively produced beyond any conventional medium to transform the cladding using all-silicon metamaterials. FIG. 6A represents a schematic 300 nm×200 nm silicon strip waveguide covered by silicon multilayer metamaterials with Λ=40 MI, and and ρ=0.625 operating at 1.55 μm. In this case, the effective permittivity of the cladding shows strong anisotropy $\in_x=2.3<\in_{core}$ and $\in_z=7.9>>1$). Since the multilayer unitcell size is much less than the operating wavelength, the guiding mechanism is fundamentally different from photonic crystal waveguide mechanism. Note that Λ<<λ so the multilayer metamaterials are fundamentally different from photonic crystal reflectors. FIG. 6B shows simulation results of the normalized x-component of the electric field for the bare waveguide. FIG. 6C shows simulation results of the normalized x-component of the electric field for the transformed cladding waveguide. For the bare waveguide, the total power inside the core is 54% and neff=1.54, but when the metamaterial cladding is added, those values are enhanced to 72% and neff=1.86. Note the power decays away faster outside the core.

The Transformed Cladding Waveguides as disclosed herein can offer a major advantage of propagation length and low power dissipation over any plasmonic approach and decreased cross-talk when compared to slot waveguides or photonic crystals. To design the waveguide, the concept of transforming optical momentum is used to control evanescent waves. Along with dense photonic integration, the reduced mode area and all-dielectric implementation provide a useful platform for enhancing nonlinear and quantum phenomena as well as optical forces. The practical all-dielectric metamaterial cladding introduced herein can be implemented using readily available lossless semiconductor building blocks at 1.55 μm. The TCW ridge waveguide described herein can use the common SOI platform, and furthermore as the core of the waveguide is not changed, inter-connects with widely used waveguide structures are possible. All-dielectric magnetism can be used to provide a dual anisotropic implementation, allowing the propagating mode in conventional fibers to reach ideal quasi-TEM behavior.

Matter waves are also governed by the wave equation. This implies the approach of reduction of tunneling of electromagnetic waves can be applied to electron waves. The approach can be used to design anisotropic effective masses and reduce the tunneling of electrons.

The devices according to the invention can be utilized for resonators and design of active devices.

The devices according to the invention can be utilized to increase the spontaneous emission of light emitting devices since the light confinement using anisotropy leads to a higher overlap of field and emitter.

The devices according to the invention can be utilized to increase the nonlinearity if the core is nonlinear.

The same approach of using anisotropy can be applied to dielectric antennas and antenna arrays to decrease their size and decrease coupling between antennas.

Figure 5:
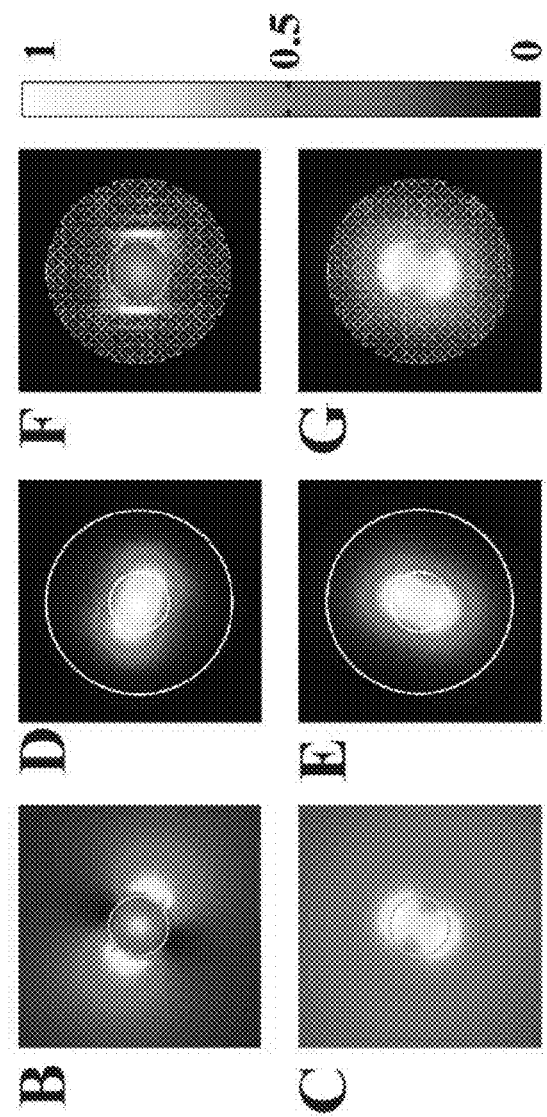
FIG. 5A shows a metamaterial fiber having a core surrounded by anisotropic cladding achieved by nanowires.
FIG. 5B shows the normalized simulated distribution of the electric energy density of the bare waveguide.
FIG. 5C shows the normalized simulated distribution of the magnetic energy density of the bare waveguide.
FIG. 5D shows the normalized simulated distribution of the electric energy density of the waveguide with anisotropic cladding.
FIG. 5E shows the normalized simulated distribution of the magnetic energy density of the waveguide with anisotropic cladding.
FIG. 5F shows the normalized simulated distribution of the electric energy density of the practical waveguide surrounded by nanowires.
FIG. 5G shows the normalized simulated distribution of the magnetic energy density of the practical waveguide surrounded by nanowires.
Figure 5:
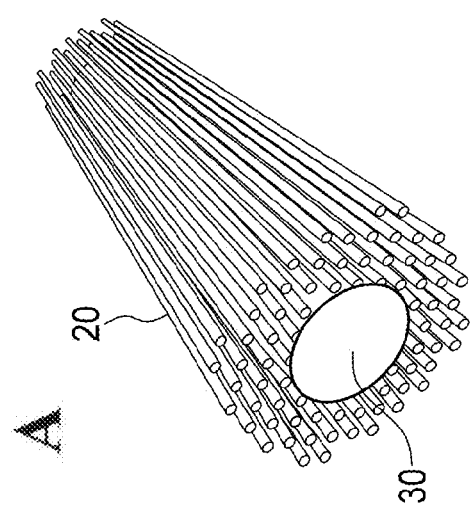

The devices according to the invention can lead to the metamaterial fiber as shown in FIG. 5 where high index semiconductor nanowires in a low index host is used as the anisotropic cladding 20. FIG. 5A is a schematic representation of a practical transformed cladding metamaterial fiber at optical telecommunication wavelength (λ=1500 nm). The metamaterial cladding 20 may include germanium nanorods embedded in porous silica surrounding a silica rod core 30. FIGS. 5B to 5G show a normalized simulated distribution of the electric (5A, 5B and 5F) and magnetic (5C, 5E and 5G) energy density of the waveguide when the core diameter is 0.15λ and the germanium fill fraction is 62.5%.

FIGS. 5B and 5C display the electric and magnetic energy density of a bare waveguide. The fraction of power inside the core to the total power (η) is 3% and the mode area is 43(λ/2ncore)2. FIGS. 5D and 5E display the electric and magnetic energy density of the waveguide with anisotropic cladding ($\in x=\in y=3.7$ and $\in z=11.8$). In the homogenized limit, the calculated η, mode area, and effective index are 35%, 1.85 (λ/2ncore)2, and 2.13 respectively. FIGS. 5F and 5G display the electric and magnetic density of the practical waveguide surrounded by nanowires which achieves the required anisotropy. According to effective theory. it achieves to effective permittivity of the cladding described with reference to FIGS. 5D and 5E. Simulated results of η, mode area, and effective index are 40%, 1.61(λ/2ncore)2, and 2.09, respectively, in agreement with the effective medium calculations. Significantly better performance can be achieved by using higher index rods in the nanowire design.

Experiments

Experiments were conducted using CST Microwave Studio, full-wave commercial software based on a finite integration technique ("FIT") to obtain simulation results for the waveguides with arbitrary cross section as shown in FIG. 4, for the coupled slab waveguides, and FIG. 6, and for the silicon strip waveguides. Hexahedral meshes with 30 lines per wavelength with lower mesh limit of 10 were assigned. The simulation area in the transverse plane was 2λ×2λ for the waveguides with anisotropic cladding and 10λ×10λ for the bare waveguides. The mode area and power ratio was estimated based on the template-based post-processing 2D integral calculations. For the plots shown in FIGS. 4 and 6 the experiment used the frequency domain solver. The simulation domain length in the y direction was only λ/40, terminated to magnetic boundary conditions to model infinite width for the slab waveguides. The open boundaries in x directions were assigned one away from slab waveguides. The propagation constants were derived from port information 1D results, and are in good agreement with analytical calculations. The simulations were made to converge with a maximum residual energy inside the calculation domain of 10-6 and 10-3 for time domain and frequency domain simulations, respectively.

For the purposes of this specification, Germanium was used as the high-index dielectric material in the waveguide cladding strata. Other high-index dielectric materials, such as Silicon and Titanium Dioxide (TiO2), as well as other materials having similar physical properties, as known to those skilled in the art, can be used with similar results. In addition, Silica has been used as the low-index dielectric material in the waveguide cladding strata in addition to air. Other low-index dielectric materials, such as porous Silica and other materials having similar physical properties as well known to those skilled in the art, can be used with similar results.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed:
1. An optical waveguide comprising:
   a core that is substantially transparent at infrared wavelengths, the core comprising a longitudinal axis and orthogonal axes, x and y, that are substantially perpendicular to the longitudinal axis, the core further compris- ing a radius in a plane defined by the orthogonal axes that is a fraction of the infrared wavelengths; and a metamaterial cladding disposed around the core, the metamaterial cladding comprising alternating thin film layers of a high index semiconductor and a low index cladding material, wherein each layer of a high index semiconductor and the low index cladding material comprises a width that is a fraction of the infrared wavelengths, and a cladding anisotropy configured to:

provide total internal reflection;

provide quasi-transverse electromagnetic mode propagation of electromagnetic signals along the longitudinal axis of the core; and provide strong confinement of light inside the core using metamaterial anisotropy.

2. The waveguide as set forth in claim 1, wherein the core further comprises silica or silicon.

3. The waveguide as set forth in claim 1, wherein the core further comprises a cross-sectional shape that is circular, square, rectangular, a slab, a slot, a strip, or a rib.

4. The waveguide as set forth in claim 1, wherein the metamaterial cladding comprises a homogeneous lossless anisotropic metamaterial.

5. The waveguide as set forth in claim 1, wherein the high index semiconductor is Germanium or Silicon.

6. The waveguide as set forth in claim 5, wherein the low index cladding material comprises one or more of air, silica, porous silica, or silicon.

7. A photonic integrated device, comprising at least one optical waveguide as set forth in claim 1.

8. A method for routing and transferring information on a photonic integrated circuit using electronic and electromagnetic signals operating at infrared wavelengths, the method comprising the steps of:

a) providing at least one optical waveguide for use with the signals, the optical waveguide comprising:

i) a core that is substantially transparent at the infrared wavelengths comprising a longitudinal axis, z, and further comprising orthogonal axes, x and y, that are substantially perpendicular to the longitudinal axis, the core comprising a radius in a plane defined by the x and y axes that is a fraction of the infrared wavelengths, and ii) a metamaterial cladding disposed around the core, the metamaterial cladding comprising alternating thin film layers of a high index semiconductor and a low index cladding material, wherein each layer of a high index semiconductor and the low index cladding material comprises a width that is a fraction of the infrared wavelengths, and a cladding anisotropy configured to: provide total internal reflection;

iii) a metamaterial cladding with strong anisotropy to provide quasi-transverse electromagnetic mode propagation of the electromagnetic signals along the z axis of the core; the metamaterial cladding configured to provide lossless sub-diffraction confinement of light; and b) placing the at least one optical waveguide on the photonic integrated circuit between an infrared transmitting device and an infrared receiving device; and c) transmitting the signals between the infrared transmitting and receiving devices.

9. The method as set forth in claim 8, wherein the core comprises silica.

10. The method as set forth in claim 8, wherein the core comprises a cross-section shape that comprises one or more from a group consisting of circular, square, rectangular, slab, slot, strip and rib.

11. The method as set forth in claim 8, wherein the cladding comprises a homogeneous anisotropic metamaterial.

12. The method as set forth in claim 11, wherein the metamaterial comprises Germanium.

13. The method as set forth in claim 8, wherein the cladding comprises alternating layers of Germanium and a second cladding material, wherein each layer of Germanium and the second cladding material comprises a width that is a fraction of the infrared wavelengths.

14. The method as set forth in claim 13, wherein the second cladding material comprises one or more from a group consisting of air, silica, porous silica and silicon.

15. An optical waveguide comprising: a core that is substantially isotropic transparent at infrared wavelengths, the core comprising: a longitudinal axis; first and second orthogonal axes that are substantially perpendicular to the longitudinal axis; and a radius in a plane defined by the first and second orthogonal axes that is a fraction of the infrared wavelengths; and a metamaterial cladding disposed around the core, the metamaterial cladding having an all-dielectric anisotropy configured to provide total internal reflection using a first component of a cladding dielectric tensor which is perpendicular to an interface of the core and the cladding and to provide strong confinement of light inside the core using a second component of the cladding dielectric tensor which is parallel to the interface of the core and the cladding.

16. The waveguide of claim 15, wherein the core comprises homogenous silica or silicon.

17. The waveguide as set forth in claim 15, wherein the core further comprises a cross-sectional shape that is circular, square, rectangular, a slab, a slot, a strip, or a rib.

18. The waveguide as set forth in claim 15, wherein the cladding comprises a homogeneous lossless anisotropic metamaterial.

19. A photonic integrated device, comprising at least one optical waveguide as set forth in claim 15.

20. The waveguide as set forth in claim 15, wherein the cladding comprises alternating thin film layers of a high index semiconductor and a low index cladding material, wherein each layer of a high index semiconductor and the low index cladding material comprises a width that is a fraction of the infrared wavelengths.

21. The waveguide as set forth in claim 20, wherein the high index semiconductor is Germanium or Silicon.

22. The waveguide as set forth in claim 21, wherein the low index cladding material comprises one or more of air, silica, porous silica, or silicon.

* * * * *